June 23, 1959   E. H. EBERSOLE   2,891,251
ATTACHABLE EYE SHADE
Filed May 7, 1956
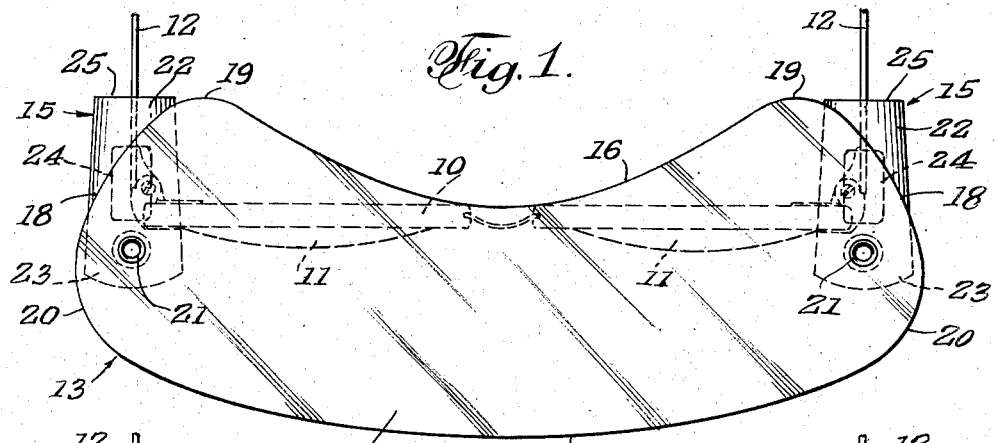
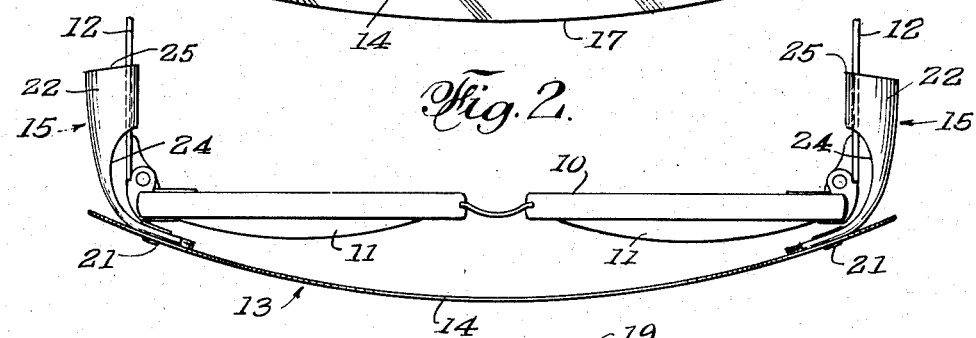
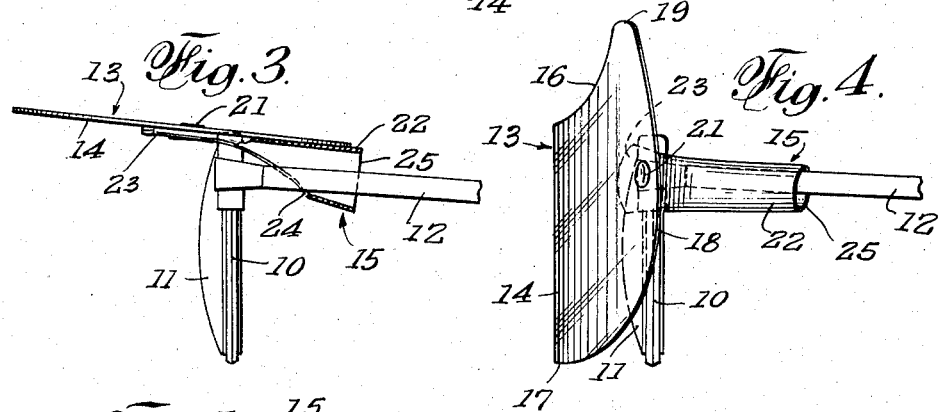
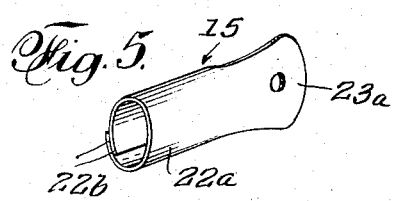
INVENTOR.
ELBERT H. EBERSOLE
BY C. G. Stratton
ATTORNEY

United States Patent Office 2,891,251
Patented June 23, 1959

2,891,251

ATTACHABLE EYE SHADE

Elbert H. Ebersole, Pasadena, Calif.

Application May 7, 1956, Serial No. 583,079

7 Claims. (Cl. 2—13)

This invention relates to an eye shade that is adapted to be held in operative position by a pair of eyeglasses on which it is detachably mounted.

An object of the present invention is to provide an attachment of the character indicated that is adapted to have two selective positions—one as a visor or eye shade transverse to and above the pair of glasses on which mounted, and the other as a sun ray-intercepting device in front or, at least, partly in front of the lenses of said pair of glasses.

Another object of the invention is to provide an attachable eye shade embodying novel and improved mounting means that facilitate conversion of the shade from a visor to a sun ray-intercepting member.

A still further object of the invention is to provide, in an eye shade of the character referred to, mounting means of the slip-on type to render more facile application of the device to a pair of eye glasses.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes preferred embodiments of the present invention, which are given by way of illustration or example only.

In the drawing, like reference characters designate similar parts in the several views.

Fig. 1 is a top plan view of an attachable eye shade according to the present invention, the same being shown in the position of a visor relative to a pair of eye glasses on which mounted.

Fig. 2 is a top edge view of said eye shade shown in the position of a sun ray-intercepting shield relative to the lenses of a pair of eye glasses.

Fig. 3 is a partly broken side view of the shade and eye glasses as in Fig. 1.

Fig. 4 is a side view of the shade and eye glasses as in Fig. 2.

Fig. 5 is a perspective view of a modified form of shade attachment fitting.

The drawing shows a typical pair of eye glasses and the same, of course, may vary substantially. In any case the eye glass frame 10 is provided with a pair of lenses 11 and with temples or side pieces 12. The usual nose-engaging means of said pair of eye glasses are omitted as not necessary to the understanding of the invention.

The present eye shade 13 comprises, generally, a transparent, preferably colored plastic sheet 14, and attachment elements 15 swivelly connected to the opposite ends of said sheet.

The plastic sheet 14 is preferably thin and quite flexible and may be made of any of the various transparent cellulosic acrylic resins, etc. Said sheet is preferably colored or tinted in the colors green, brown or yellow so as to modify sun glare, when used as a visor, and to intercept some of the more brilliant sun rays when used as a shield. In practice, a sheet having a thickness in the nature of 1/32" may be advantageously used.

As seen best in Fig. 1, said sheet 14 is formed to have a concavely curved edge 16 formed on a curvature generally conforming to the transverse curvature of the human forehead. The opposite edge 17 is preferably convexly curved on a line of curvature substantially shallower or flatter than that of edge 16. The opposite edges 18 of said sheet are preferably convexly curved and the same are blended into the curved edges 16 and 17 by rounded corners 19 and 20, respectively. The width between edges 16 and 17 is sufficiently large to have full shielding size for the lenses 11 when said sheet is disposed in front of said lenses.

The attachment elements 15 are shown as connected adjacent the sheet edges 18. Eyelets 21 are used for this purpose. Said eyelets are so disposed relative to forehead-conforming edge 16 that the same will reside on a transverse line that is somewhat forward of the eyeglasses, as best seen in Fig. 1.

The elements 15 that are shown in Figs. 1 to 4 are alike on both sides of the shade. These elements are preferably formed as short tubes 22 of a soft or pliable plastic material as differentiating from the semi-rigid and flexible material of the sheet 14. Thus, each such tube may be flattened as at 23 so that a pivot eyelet 21 may be passed therethrough and effect a pivotal connection of element 15 and sheet 14.

On the side thereof away from the shade sheet 14, each tube is shown as provided with an opening 24 that is relatively longer than wide, the length being such as to enable the introduction of the ear-engaging portion of a temple 12 into the tube. Since the material of the tube is pliable, as above indicated, ear pieces of considerable width can be accommodated, the tube merely flattening, as necessary, to allow passage of the ear piece outwardly from the open end 25 of the tube.

It will be understood that eye-glasses vary in width and that the transverse spacing of the temples 12 thereof varies accordingly. Inasmuch as the tube 22 is pivoted, the same, together with its initially oversize diameter and the flexibility of the sheet 14, enables the accommodation of eye shades of a standard size by eye glasses varying in size. Thus, by providing eye shades of two standard sizes—large and small—or at the most, three standard sizes, all sizes of eyeglasses may be fitted properly with an eye shade of the present design.

When disposed as a visor, the sheet is approximately normal to the general plane of the eye glasses and the elements 15 are in the substantially straight and unstressed condition shown in Figs. 1 and 3. The position of the sheet may be changed to that of a shield in front the lenses 11 simply by turning the tubes 22 on their axis around the temples 12. This movement will induce flexure of sheet 14 and also flexure of the flattened ends of said tubes 22. Since the eyelets 21 are moved through 90° by such rotation of the tubes, the sheet 14 assumes a frontal position with relation to the eye glasses, as shown in Figs. 2 and 4. Because of the flexure of the sheet 14 and tubes 22, this position is retained until re-rotation of said tubes to their initial positions brings the sheet 14 back to its visor position.

In the modification of Fig. 5, it is shown that instead of being a pliable tube, the element 15 may be formed of a material of the flexible nature of sheet 14, although thinner than said sheet. By forming the portion 22a of said element with overlapping edges 22b and providing the same with an eyelet-engaging end 23a, said element may be applied to a temple 12 from above rather than from the end. The end 23a has suitable longitudinal flexibility to enable the same to flex, as above described, during conversion of the device from a visor to a shield.

It will be clear that elements 15 may be made in various ways for separable connection to the temples of a pair of eye glasses and embodying the ability to flex as above.

It will be realized that the device may be adjusted to an intermediate position between its visor and shield positions and the adjusted position will be retained until changed.

While the foregoing has illustrated and described what I now contemplate to be the best modes of carrying out the invention, the constructions are, of course, subject to modification without departing from the spirit and scope of the invention. It is, therefore, not desired to restrict the invention to the particular forms of construction illustrated and described, but to cover all modifications that may fall within the scope of the appended claims.

Having thus described my invention, what I claim and desire to secure by Letters Patent is:

1. An attachable eye shade comprising a generally flat and flexible sheet formed to span across the width of a pair of eye glasses having side temples, temple-engaging elements more pliable than said sheet swivelly connected by one end to the opposite ends of said sheet, said elements being longitudinally flexible and flexible relative to the plane of the sheet, and each element being provided with a temple-receiving tubular end opposite to the end connected to the sheet.

2. An attachable eye shade according to claim 1 in which the mentioned temple-engaging elements are each formed with an opening intermediate the ends thereof and on the side away from the sheet to which connected, the temples of a pair of eye glasses being enterable into said openings to project through the free tubular ends of the elements, said elements being formed of pliable material to conform to a portion of the temples entered thereunto.

3. An attachable eye shade according to claim 1 in which the temple-engaging tubular elements are longitudinally split and the longitudinal edges thereof are overlapped.

4. An eye shade comprising a transparent and flexible sheet, eye glass temple-engaging and transversely flexible elements, means swivelly connecting one end of each element to opposite ends of the sheet, said elements being tubular and having an internal diameter substantially greater than the transverse dimension of the temples of a pair of eye glasses to be used therewith and adapted to have free rotational engagement about the axis of each of said temples to hold said sheet in the position of a visor above the eye glasses when said elements are unflexed and to hold said sheet in at least partial ray-shielding frontal position relative to the eye glasses when said elements, from their unflexed position, are rotated and flexed transversely to their length.

5. An eye shade according to claim 4 in which the elements are tubular where they engage the temples and generally flat at their swivel connections.

6. An eye shade comprising a transparent and elongated sheet, a pivot eyelet at each end of the sheet, a transversely flexible and pliable element connected by one end thereof to each said eyelet, each element being provided with a tubular end opposite to the eyelet-connected end thereof, each tubular end having a temple-receiving opening between the eyelet and the opposite end thereof, each tubular end having an internal diameter substantially greater than the transverse dimension of the temple of a pair of eye glasses to be used therewith each element being swivelable on its connecting eyelet in the general plane of the sheet and, when engaged with the temples of a pair of eye glasses, holding said sheet in the position of a visor above and generally transverse to the plane of such eye glasses, and the elements, upon rotation of the tubular ends thereof relative to and while engaged with the temples, being transversely flexed in a direction away from the sheet and the eyelet-connected ends of said elements holding the transparent sheet at least partially in front of and in ray-shielding position relative to the eye glasses.

7. An eye shade comprising a sheet of relatively stiff but relatively flexible light-shielding material, transversely spaced fastening means on the sheet and soft pliable tubular connector elements, one secured to the light-shielding sheet by one of said fastening means, each element having an opening and said openings being adapted to receive the temples of a pair of eye glasses to be used with the shade, said openings having an internal size sufficiently large to form a loose fit with such temples to permit rotation of said elements around the temples fitted therein to enable rotation of the light-shielding sheet between different angular positions.

References Cited in the file of this patent
UNITED STATES PATENTS

| | | |
|---|---|---|
| 1,166,493 | Thompson | Jan. 4, 1916 |
| 2,224,560 | Wentz | Dec. 10, 1940 |